(12) United States Patent
Siegel et al.

(10) Patent No.: US 12,209,040 B2
(45) Date of Patent: Jan. 28, 2025

(54) ZERO-EMISSIONS REFINERY SYSTEM AND METHOD FOR LIQUID WASTE STREAM RECOVERY OF CLEAN WATER AND VALUABLE BY-PRODUCTS

(71) Applicants: Stanley Michael Siegel, Ruffs Dale, PA (US); Mark E. Ward, Waco, KY (US); C. George Bower, Amherst, NH (US)

(72) Inventors: Stanley Michael Siegel, Ruffs Dale, PA (US); Mark E. Ward, Waco, KY (US); C. George Bower, Amherst, NH (US)

( * ) Notice: Subject to any disclaimer, the term of this patent is extended or adjusted under 35 U.S.C. 154(b) by 0 days.

(21) Appl. No.: 18/745,806

(22) Filed: Jun. 17, 2024

(65) Prior Publication Data

US 2024/0417302 A1    Dec. 19, 2024

Related U.S. Application Data

(60) Provisional application No. 63/508,465, filed on Jun. 15, 2023.

(51) Int. Cl.
| | | |
|---|---|---|
| C02F 11/04 | (2006.01) | |
| A01G 33/00 | (2006.01) | |
| B01D 53/047 | (2006.01) | |
| B01D 53/14 | (2006.01) | |
| C02F 1/00 | (2023.01) | |

(Continued)

(52) U.S. Cl.
CPC .............. *C02F 11/04* (2013.01); *A01G 33/00* (2013.01); *B01D 53/0476* (2013.01); *B01D 53/1468* (2013.01); *B01D 53/1493* (2013.01); *C02F 1/004* (2013.01); *C10L 3/08* (2013.01); *C12F 3/02* (2013.01); *B01D 2252/504* (2013.01); *B01D 2257/304* (2013.01); *B01D 2257/504* (2013.01); *B01D 2258/05* (2013.01); *C02F 2103/32* (2013.01); *C02F 2103/36* (2013.01)

(58) Field of Classification Search
CPC .... C10L 3/08; C02F 1/26; C02F 11/04; C02F 9/00; C02F 2103/32; C02F 2103/36; A01G 33/00; B01D 53/0476; B01D 52/1468; B01D 53/1493; B01D 2252/504; B01D 2257/304; B01D 2258/05; C12F 3/02
USPC ........................................................ 210/603
See application file for complete search history.

(56) References Cited

U.S. PATENT DOCUMENTS

| | | | | |
|---|---|---|---|---|
| 2015/0118723 A1* | 4/2015 | Duzoglou | .............. | C12M 43/00 |
| | | | | 435/292.1 |
| 2015/0122120 A1* | 5/2015 | Stensland | .......... | B01D 53/1493 |
| | | | | 95/149 |
| 2018/0079672 A1* | 3/2018 | Meyer | ................ | B01D 53/1475 |

\* cited by examiner

*Primary Examiner* — Claire A Norris

(57) ABSTRACT

In producing ethanol suitable for alcoholic beverages or fuels, the separation of stillage involves a complicated treatment system necessary to meet stringent air emissions standards and effluent discharge limits. High water content of stillage creates a difficult process mass flow balance configuration resulting in a large power demand and footprint. The present invention simplifies the production and usage of valuable stillage by-products and reduces net energy consumption and emissions to zero with a novel system and method involving a step sequence of: a solid liquid separation; at least one digester arrangement; a closed gas separation system; algae grow nutrient up-take system; a nutrient separation system; an ultra-filtration water system enabling the off-take by-products to be used by the system and an off-take market for the by-products and its purified (Continued)

water. All produced by-products including carbon dioxide ($CO_2$) and methane ($CH_4$) are used in the system or exported as products.

4 Claims, 8 Drawing Sheets

(51) Int. Cl.
*C10L 3/08* (2006.01)
*C12F 3/02* (2006.01)
C02F 103/32 (2006.01)
C02F 103/36 (2006.01)

ZERO-EMISSIONS REFINERY SYSTEM AND METHOD FOR LIQUID WASTE STREAM RECOVERY OF CLEAN WATER AND VALUABLE BY-PRODUCTS

The current application claims a priority to the U.S. provisional patent application Ser. No. 63/508,465 filed on Jun. 15, 2024. The current application is filed on Jun. 17, 2024, while Jun. 15, 2024 was on a weekend.

FIELD OF THE INVENTION

The present invention generally relates to the separation and recovery technology of raw thin stillage or whole stillage produced in the alcohol distillation process for beverage and fuel markets, its by-products and purified water under a closed environmental system eliminating air emissions and contaminated water discharge. More specifically, the present invention is a zero-emissions refinery system and method for liquid waste stream recovery of clean water and valuable by-products.

BACKGROUND OF THE INVENTION

There are many distillers and fermenters in the world producing alcohol and ethanol-based products; one gallon of distilled product involves an average use of 4.7 gallons of water. Considering global distillation and fermentation production volumes of beer, wines, distilled spirits, and fuels, the treatment of raw stillage streams is an environmental problem of vast proportions, affecting air, water, and land contamination. Prior art addresses handling of the stillage separation in an open type of environment with the following steps: 1) decanter centrifuge liquid solid separation; 2) thin stillage stream evaporation; 3) distillers dried grains with solubles (DDGS) drying; 3) thermal oxidizers (TO) to treat off-gas created in prior steps [i.e., but which generates organic compounds (VOCs)]. TOs address one problem but at the cost of creating environmental and energy problems of their own: TOs use natural gas to combust a lean waste vapor stream which, in turn, produces air contamination through the combustion of natural gas (or other energy input) and the generation of $CO_2$, $NO_x$, and $SO_x$ produced by combustion of the remaining stillage products.

Other prior art handles stillage separation in an open type environment with the following steps: 1) decanter centrifuge liquid solid separation; 2) thin stillage sent to a digester; 3) DDGS; 3) TOs to handle the off-gas produced by the earlier process steps which contains VOCs which must be destroyed by combustion. Step 3 creates an environmental and energy problems of its own; TOs require the addition of fuel such as natural gas to combust a lean waste stream which, in turn, produces air contamination resulting from the combustion of the support fuel and the VOCs. Furthermore, Step 2 produces a large effluent stream of contaminated water, which prior art further separates in an open type environment method collecting recovered organics as a waste stream and discharging water under a local, state of federal permit. In addition, the digester in Step 3 produces an anaerobic generated gas stream comprised of methane, $CO_2$, and other contaminates. During winter months, the methane is used as fuel for heating the digester or can be purified to meet applicable pipeline or compressible natural gas (CNG) renewable gas standards; more importantly, the uncollected $CH_4$, the contaminates, VOCs, and the $CO_2$ are sent to a TO which requires the addition of natural gas or other fuel to combust the lean waste stream which, in turn, produces more air contamination resulting from the combustion of the support fuel and the contained contaminates.

Prior art offers no method for eliminating air emissions or for water treatment or reuse. Valued compounds in the raw stillage offer a rich stream of by-products, which prior arts have addressed without balancing the whole energy, marketing, and environmental costs.

The present invention eliminates the need for TOs and eliminates air emissions and water discharge, thereby solving the serious environmental problems associated with prior art. The present invention also enhances the efficiency and effectiveness of the complete separation process. Furthermore, the present invention merges the systems for the recovery of valuable nutrients, water, and solids into a self-sustaining grow and export facility at net zero emissions. The present invention is a closed-loop energy refinery and purification system, producing clean water, $CO_2$, $CH_4$, and other valued by-products that are used to support the closed refinery system or exported to support other commercial uses.

SUMMARY OF THE INVENTION

From a stream of raw stillage (i.e., biomass water mixture) generated from the production of alcohol, the present invention synergistically yields: a) clean water for reuse; b) anaerobic digesting of both raw stillage and algae rich in nutrients, containing trace elements and various bioactive substances, algae has the advantages of artificial reproduction, rapid growth, and a short breeding cycle; c) nutrients (N, P, K) conversion of lipids found in algae into renewable natural gas and other commercially valuable by-products; d) liquid and solid fertilizer for internal use and export; e) renewable natural gas from stillage organic compounds; f) renewable $CO_2$ for internal use and export; and g) an agriculture algae grow facility for enhanced renewable natural gas production and export of algae by-products. By redirecting the algae growth into the refinery system, the nutrients and lipids found in algae are then converted into $CH_4$ and $CO_2$, thereby improving the process efficiency of the refinery system.

DETAILED DESCRIPTION OF THE INVENTION

All illustrations of the drawings are for the purpose of describing selected versions of the present invention and are not intended to limit the scope of the present invention.

The following are elements that are assumed to be understood as logically defined, existing technically, further workings and further details that will make a mature industrial process:

Variations in types of raw stillage to be processed—to be controlled by automation and AI functions.

Types and strains of algae to be cultured/grown exist and will be refined with further system testing using lab automation and AI functions.

Algae described herein shall mean a group of any type of algae or bacteria.

Refinery system and method being controlled by automation and AI functionality.

Process sizing and load balancing as a product of good engineering practices.

Natural polymeric flocculants (i.e., green feature) to be used that are cheap biopolymers, particularly polysaccharides such as starch, cellulose, and chitosan.

Algae harvesting techniques are not limited to centrifugation, gravity sedimentation, screening, filtration, and air flotation.

Said system and method not limited to having a no-algae grow section; full yearly algae grow section or a controlled seasonal grow section arrangement; having the nutrient section sized and automated to balance the nutrient load variation of a reduced or no algae grow section.

Another novel element assumption is the present invention processes clean water (i.e., no heat requirement). Also, the heat generated from the gas processing section supplies heat to the digester, solid nutrient and algae grow sections reducing power requirements and avoiding air emissions.

A novel component disclosed herein is a gas processing scrubber that takes high oxygen concentrated pretreated algae remains as a scrubbing liquid to convert H2S into elemental sulfur and oxidized to sulfur/sulfate due to the high dissolved oxygen concentration and the conversion of H2S by the algae/H2O2 remains; with the scrubber's blow down being returned to at least one digester with the blow down liquid further functioning as an $H_2S$ to sulfur converter. This scrubber can be, is not limited to, a spray towers, a cyclone spray, a venturi scrubber, an orifice scrubber, an impingement scrubber, a tray scrubber, or a packed bed scrubber.

Figure 1:
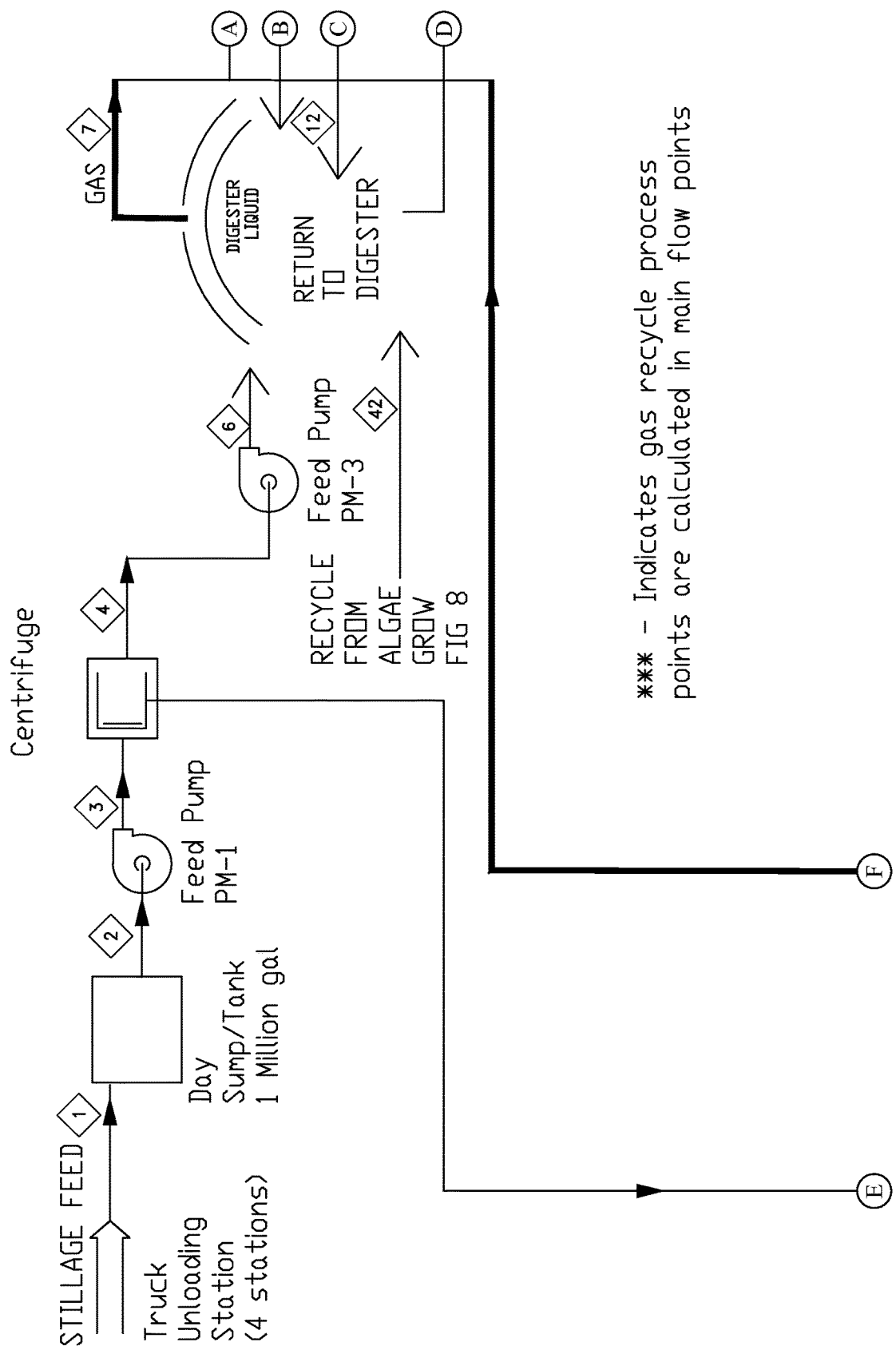
FIG. 1 sets forth a schematic diagram of a stillage treatment system according to one possible embodiment of the invention, among other alternative embodiments.
Figure 2:
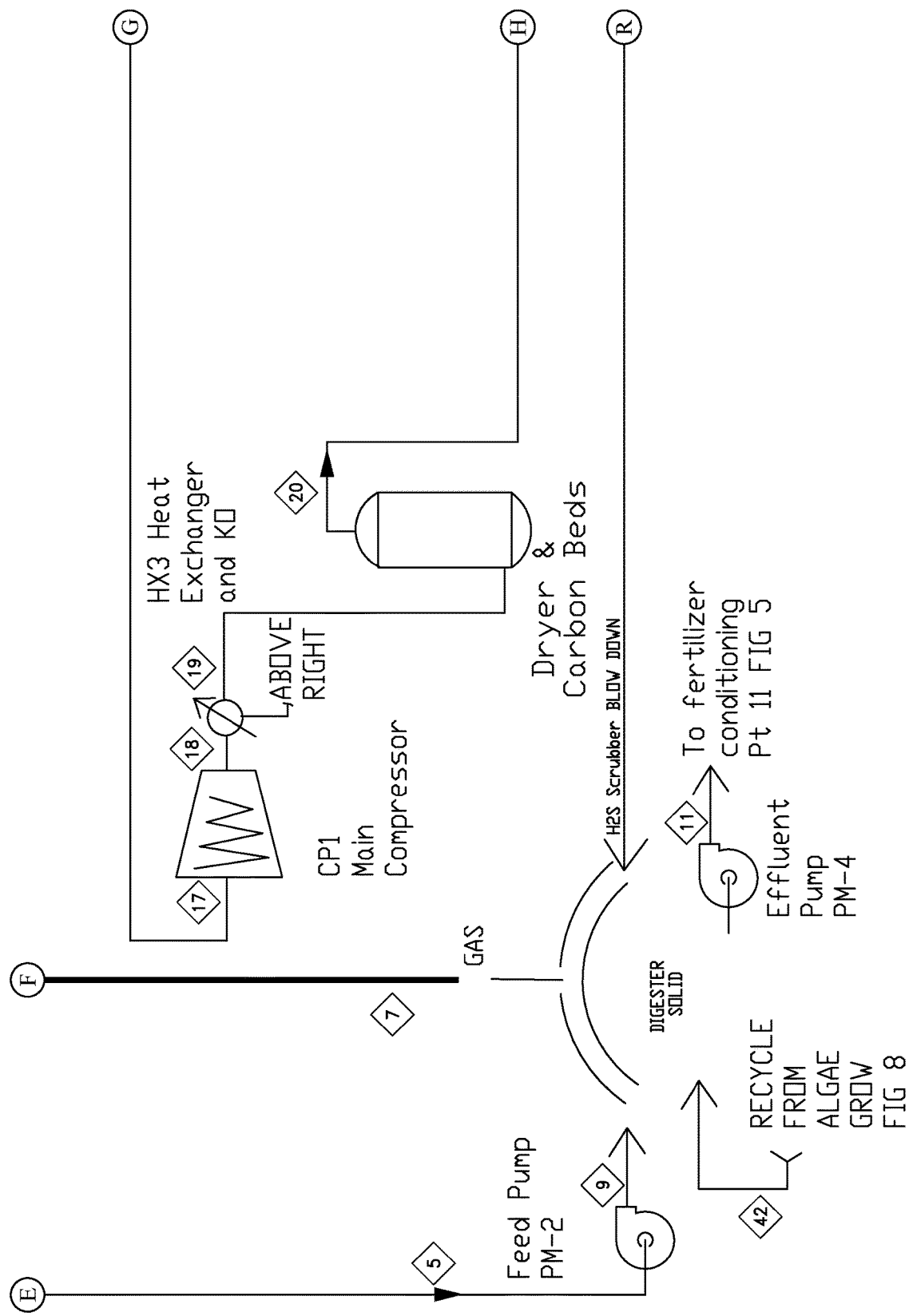
FIG. 2 is a continuation of FIG. 1.
Figure 3:
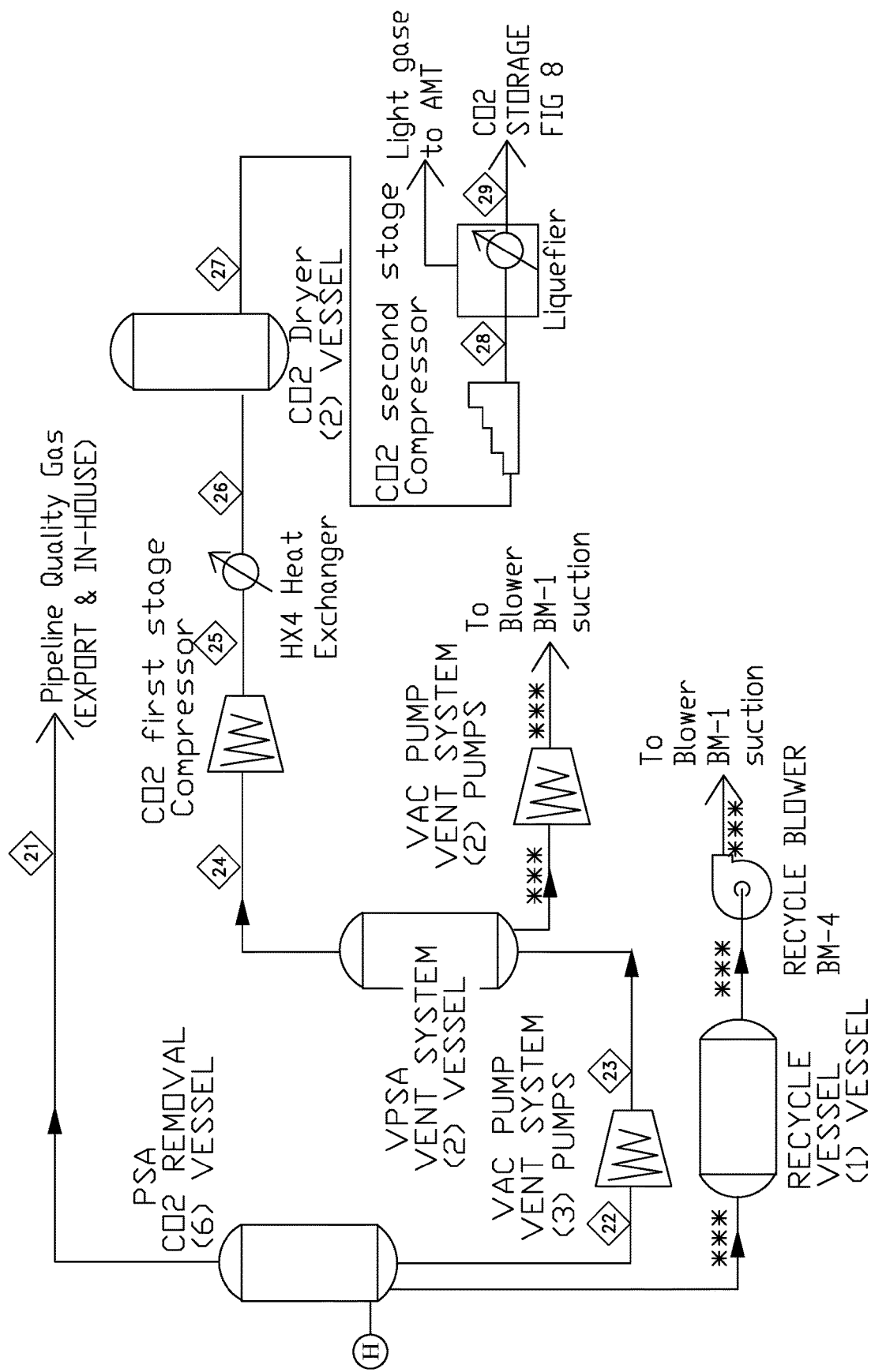
FIG. 3 is a continuation of FIG. 1.
Figure 4:
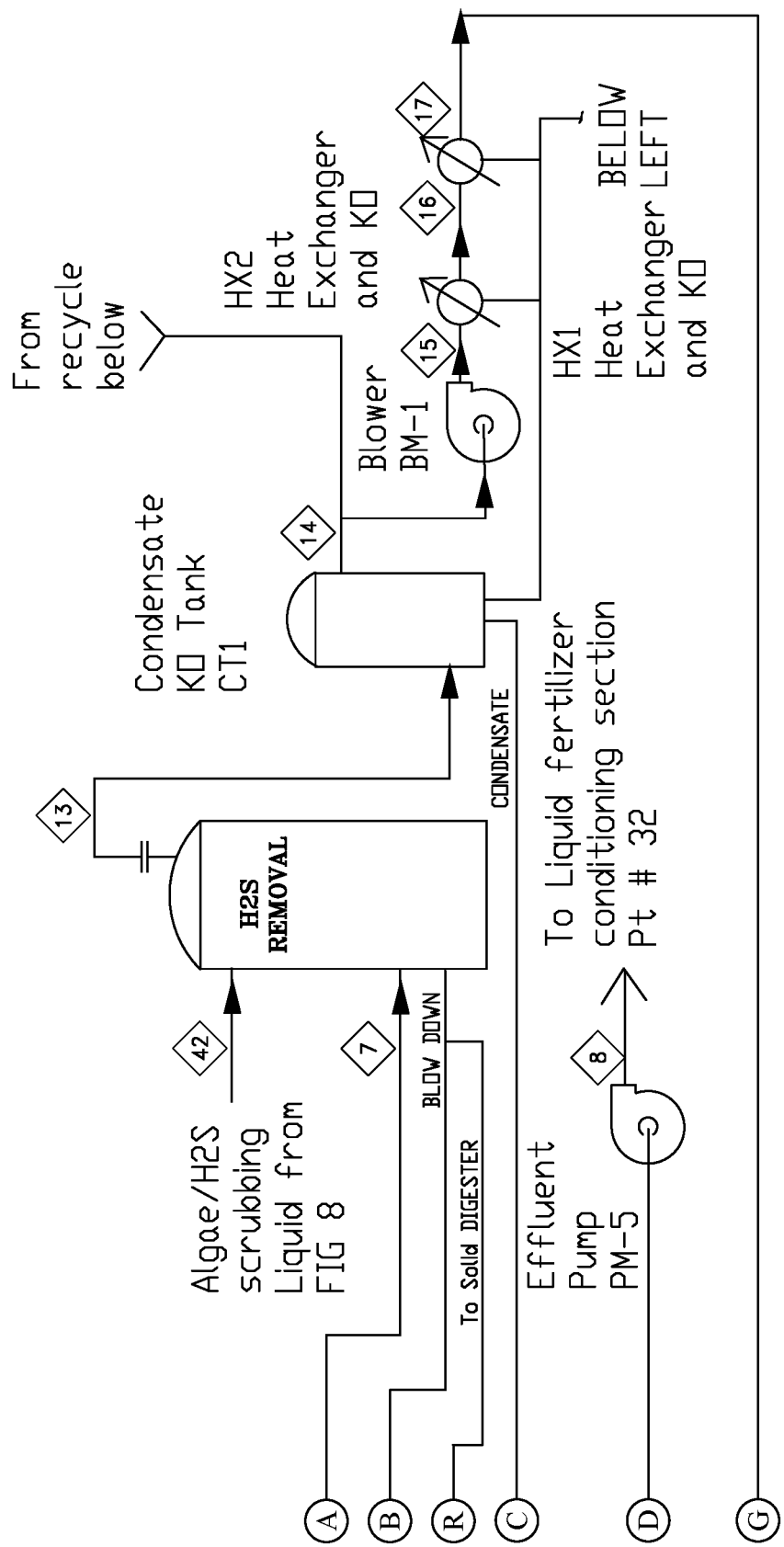
FIG. 4 is a continuation of FIG. 1.

FIGS. 1 through 4 illustrate process point 1 that allows a station to unload the incoming stillage by truck, but this delivery of raw stillage is not limited to trucking; other methods include pipeline, railcar, or other types of stillage transport and delivery. After process point 1, a short-term storage sump/tank provides extra capacity and can be equipped with a mixer, a pH adjuster, chemical injectors, and other treatment devices.

Process point number 2 allows for suction pressure and flow to PM-1 pump to increase process pressure to deliver stillage to centrifuge 3 that can be any device that separates solids from liquids. The feed pump PM-1 is not limited to conveying the stillage and may be used to blend or size the solids in the stillage. Centrifuge liquid output 4 is conveyed to a liquid digester 6 via feed transfer pump PM-3 which may incorporate a suction hopper for capacity control. Liquid digester is a fast-acting digester with a short 8-to-24-hour cycle time which may or may not contain additives or physical processing to accelerate or control anaerobic activity. Digestate is the resulting liquid effluent mixture leaving pump PM-5. Digestate is a nutrient-rich substance produced by anaerobic digestion and that will be used in the downstream by-product process. This digestate consists of remaining indigestible material and dead micro-organisms; the volume of digestate will be in the range of 85% to 95% of the process feed pumped into the digester. Effluent pump PM-5 transfers the digestate to the liquid/solid fertilizer section where the algae grow, and the water purification and conditioning section is described below.

The centrifuge's solid discharge, flow 5, becomes the suction feed to PM-2 transferring the discharge to the solid digester influent 9. Unlike the liquid digester influent 6, the solid digester influent 9 enters a slow-acting digester with a long 10-to-30-day cycle time. Effluent pump PM-4 transfers the digestate to the nutrient recovery section described herein.

Both liquid and solid digesters use anaerobic digestion, producing a gas phase by-product 7 that contains methane ($CH_4$), carbon dioxide ($CO_2$), hydrogen sulfide ($H_2S$), water ($H_2O$), and other trace contaminates. To separate this gas phase mixture the process points described in the following section are incorporated as the preferred endowment of the present invention.

The digesters can accommodate, but are not limited to, 250 gallons per minute (gpm) of stillage with an assumed 8% concentration of organic matter into biogas, generating a methane production of 1345 standard cubic feet per minute (scfm) at 100% efficiency; this mass flow and efficiency is only for demonstration purposes.

Pretreated algae with $H_2O_2$ enters the anaerobic environment at process point 42; lipids are first hydrolyzed to glycerol and free long-chain fatty acids (LCFAs). This process is catalyzed by extracellular lipases that are excreted by acidogenic bacteria. Further conversion of the hydrolysis products takes place in the bacterial cells. Algae organics growth is predicted to be in the range of 5.7 pounds (lbs.) per year per square feet (sqft.) of grow area; assuming a methane yield of 400 liters (L) $CH_4$ per kilogram (kg) volatile solid results in a methane gas flow in the range of 88 scfm to 350 scfm. Production volumes will vary depending on the specific design of the algae bed and its grow surface area. The above algae grow rate and $CH_4$ conversion efficiency is cited only for demonstration purposes. The $H_2O_2$/Algae treatment process enables the pretreated algae to be broken-down properly to be digested in the anaerobic digester and to be used as a gas scrubbing solution in the $H_2S$ scrubber reacting on the gaseous $H_2S$ biogas stream; both the digester and the $H_2S$ scrubber uses the reaction $H_2S+H_2O_2 \rightarrow SO+2H_2O$, injection through the $H_2S$ scrubber results in most or all of the broken-down Algae mixture enhancing the anaerobic action of the digester.

A combined gas flow from both digesters (i.e., process point 7) enters an $H_2S$ removal vessel that can be, but not limited to, a gas-to-liquid sulfur scrubber utilizing aerobic bacteria or algae/mixture action to oxidize the inorganic sulfur compound $H_2S$ to elemental harmless sulfates or sulfur. The sulfate/sulfur water mixture from the scrubber is removed during a blowdown step of the scrubber's control system and the valuable blowdown liquid mixture is returned to both digestors or either digestor allowing further reduction of $H_2S$ in both digestors or either digestor by the reaction of aerobic bacteria or the algae/$H_2O_2$ mixture. An alternative to the gas-to-liquid sulfur scrubber is an $H_2S$ separation unit using at least one $H_2S$ adsorber utilizing a solid adsorption material that captures $H_2S$. Another alternative to the gas-to-liquid sulfur scrubber is a $H_2S$ separation unit that injects oxygen ($O_2$) or $H_2O_2$ at a controlled rate into both digestors or either digestor, reacting with $H_2S$ to create elemental sulfur, thereby reducing $H_2S$ to a low level at process point 7. The $H_2S$ conversion is not limited to these three options and is not intended to limit the scope of the present invention.

Process point 13 rich in water enters a condensate tank and pump (i.e., not shown) system allowing a water mixture to be returned to the digester 12. Process point 14 enters the suction stage of blower BM-1 which contains the upstream gas flow from the condensate knockout tank CT-1 and a redirected downstream recycle gas stream. Blower BM-1 supplies positive process gas pressure required for the downstream gas processing equipment.

Process points 15 and 16 involve heat exchangers and water knockout units to lower gas temperatures and collect and remove liquid condensate. The liquid condensate is conveyed to the upstream condensate knockout tank CT-1 which returns the liquid to the liquid digester. Process point 17 involves the suction of a gas compressor which supplies the down-stream gas pressure and flow required for the gas separation section. Water is further removed by a condensing heat exchanger between process point 18 and 19, which is returned the condensate KO tank CT1.

Process point 19 involves at least one dryer and carbon bed section which adsorbs non-methane organic compounds (NMOC), moisture, siloxanes, trace $H_2S$, and other trace compounds. The dryer-and-carbon bed unit is a solid adsorbent bed that captures compounds onto the surface and into the pores of the solid adsorption material. The compounds are removed from the surface and pores of the adsorption material by regeneration of the adsorption material based on the de-adsorption properties of the compounds, using temperature and pressure to create a second compound stream, which is collected and removed from the system and stored as a low-grade fuel by-product.

Process point 20 enters a pressure swing adsorption (PSA) unit or any other gas separation system, which contains $CH_4$, $CO_2$, trace organic and inorganic compounds, and air generated by the upstream process. The PSA separates the $CH_4$ and, at process point 21, delivers the gas to a natural gas pipeline, a storage tank, or to a CNG fuel station as renewable natural gas.

Process point 22 involves the regenerative gases from the PSA unit consisting of $CO_2$, air, trace organic and inorganic compounds, and trace $CH_4$; these gases enter a vacuum pump system, which supplies the needed vacuum to regenerate the PSA unit and supplies the needed downstream process pressure for the vacuum pressure swing adsorption (VPSA) unit. The inlet of the VPSA unit contains $CO_2$, small amounts of $CH_4$, and small amounts of air generated by the upstream process. The VPSA unit consists of at least two vessels that capture trace amounts of $CH_4$, and trace organic and inorganic compounds. The VPSA unit is regenerated using a second vacuum pump that returns the $CH_4$, organic, and any inorganic compounds upstream to be reprocessed as a recycle stream using recycle blower BM-4.

Process point 24 enters the suction of the $CO_2$ first stage compressor and contains the upstream $CO_2$ product gas flow with a small percentage of air and trace $CH_4$. The $CO_2$ first stage compressor supplies the positive process gas pressure required for the downstream gas processing equipment. The $CO_2$ first stage compressor is discharged at process point 25, allowing the process heat exchanger HX4 to lower the gas temperature to a proper temperature range for the suction of the $CO_2$ second stage compressor suction flow.

The $CO_2$ second stage compressor discharge pressure 28 is taken into the $CO_2$ liquefier that uses gas pressure and heat exchanges to cool below the critical point of $CO_2$, creating a liquid $CO_2$ stream 29; a second air stream with trace non-condensable air is vented to atmosphere.

Figure 5:
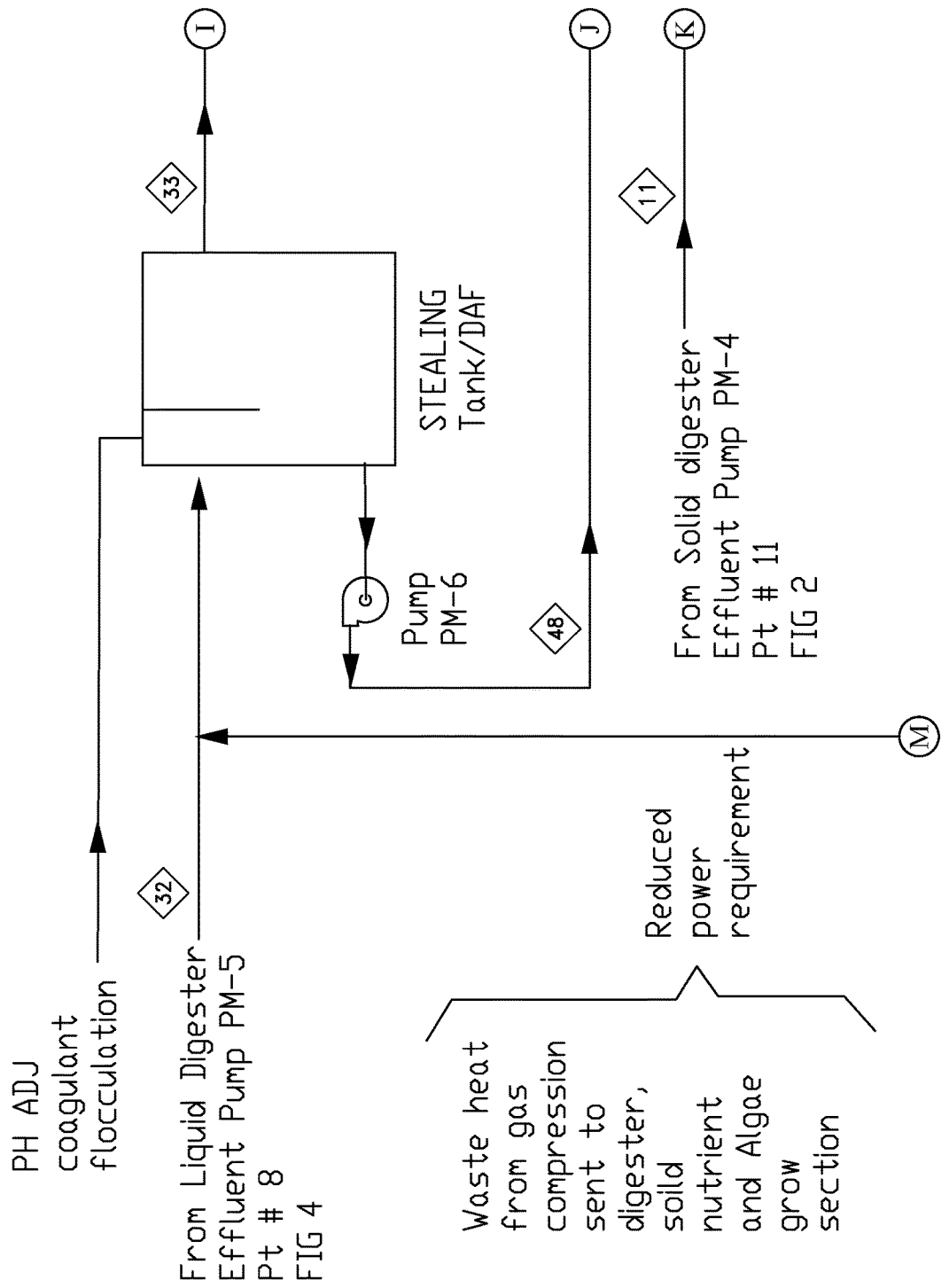
FIG. 5 is a continuation of FIG. 1.
Figure 6:
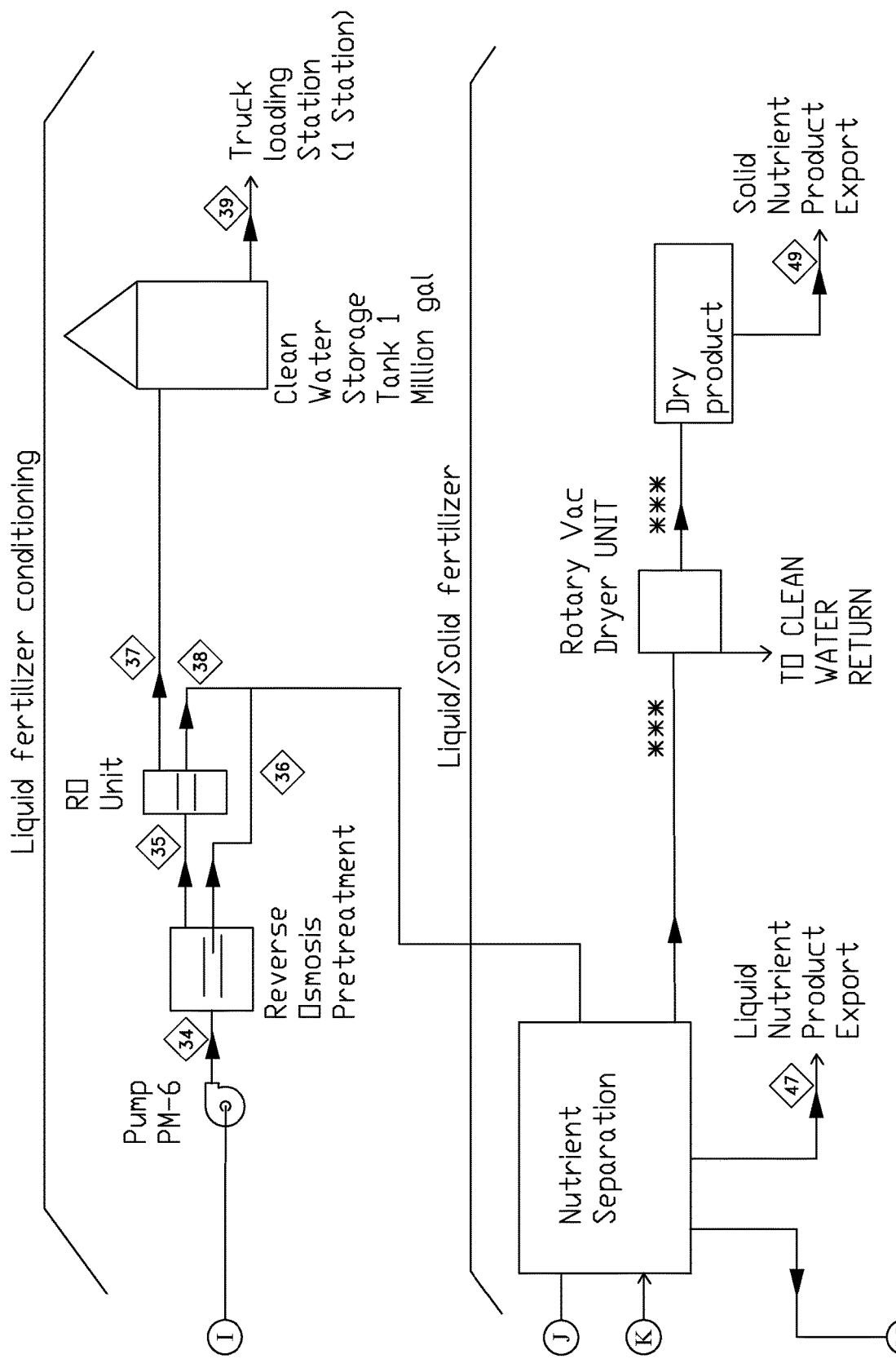
FIG. 6 is a continuation of FIG. 1.
Figure 7:
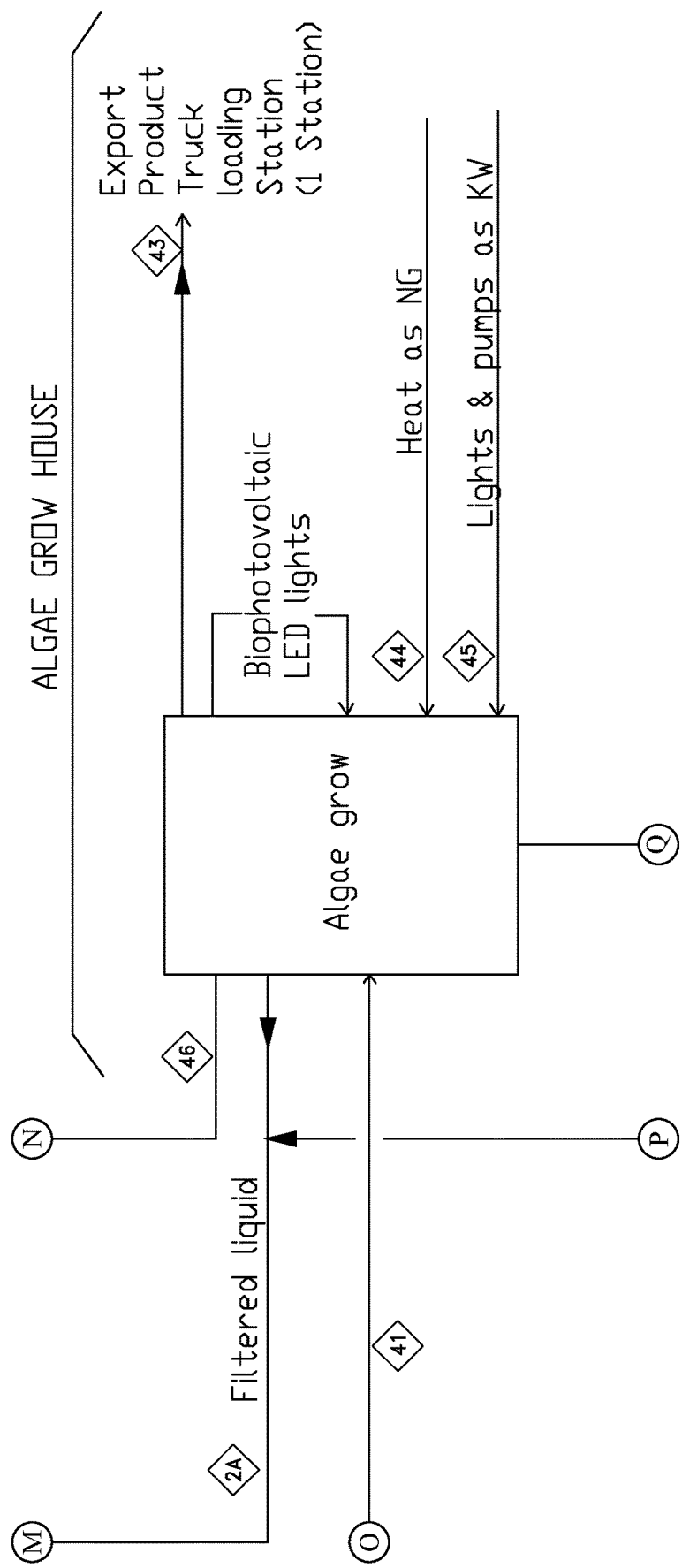
FIG. 7 is a continuation of FIG. 1.
Figure 8:
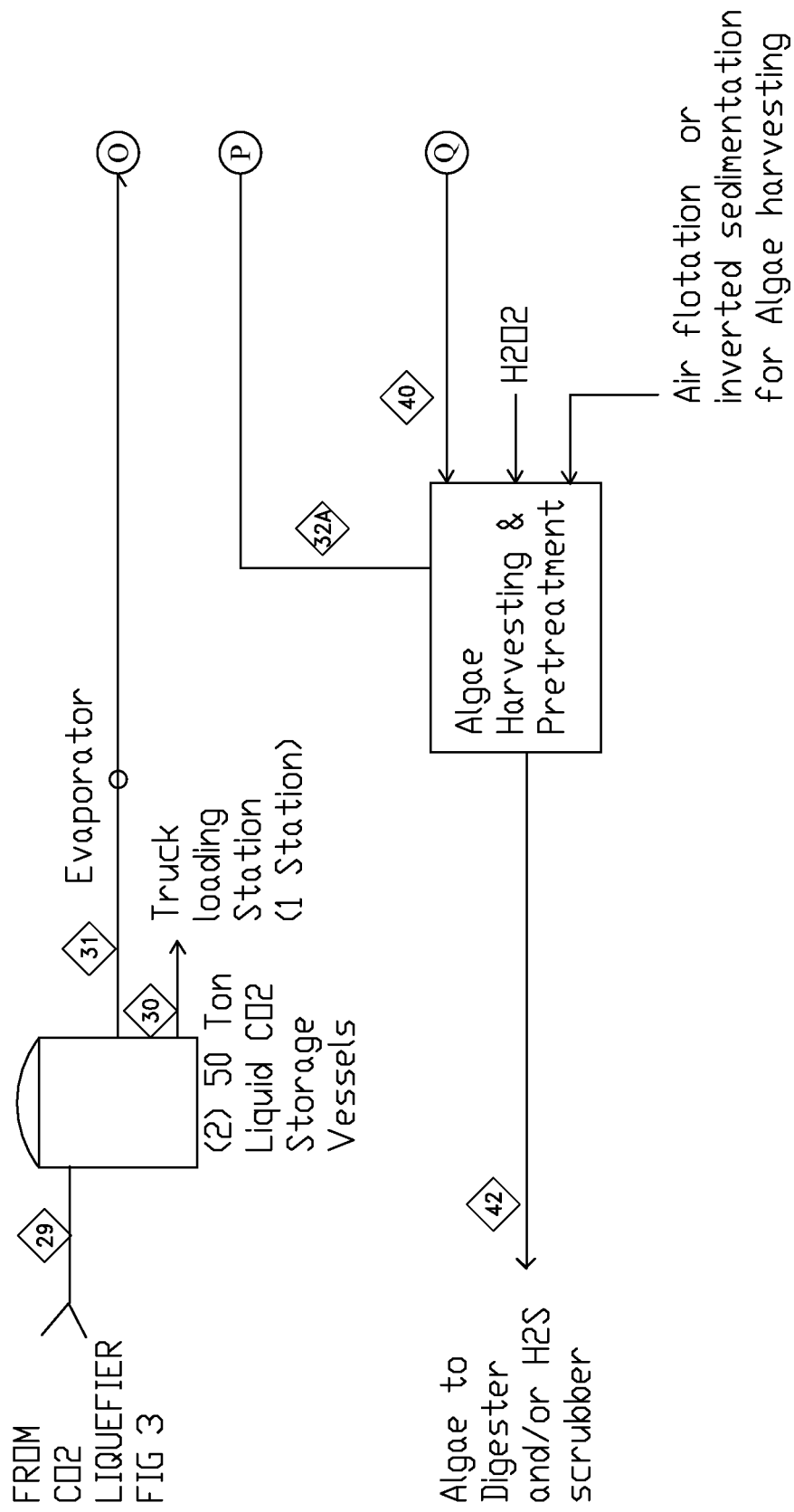
FIG. 8 is a continuation of FIG. 1.

Process point 29 enters the liquid $CO_2$ storage vessel which acts as a day tank (FIGS. 5 through 8) waiting for a truck 30, or other transport means, hauling to an end user or to FIGS. 5 through 8, a gas feed 31 to a local evaporator unit discharge 41 to be used as $CO_2$ gas for the algae grow process.

FIGS. 5 through 8 illustrate process point 32 taking the effluent from the digesters to a stealing tank, a DAF unit, and other liquid solid separators (i.e., including, but not limited to, pH adjusting, coagulation/flocculation and electrocoagulation) to separate the suspended particles in the water. Process point 32A takes pre-filtered liquids containing a reduction in nutrients back to the same process point 32 for further processing. The gathered particles are conveyed to nutrient separation section via pump PM-6 and discharge 48. The less dense liquid from the stealing tank 33 is conveyed (i.e., 33 and 34) to the reverse osmosis pretreatment unit via pump PM-6.

In the reverse osmosis pretreatment process, additional filtration of suspended particles renders the clean water side 35 acceptable for the main RO unit, which discharges clean water 37 into the clean water storage tank and later exported via truck, rail, or pipeline to an end user. Both the dirty side flow 36, 38 of the reverse osmosis pretreatment unit, and the RO unit is conveyed to the nutrient separation section.

The nutrient separation section has two product flow streams: 1) liquid nutrient product 47; and 2) solid nutrient product 49, both of commercial value to end users. The nutrient separation section uses, but not limited to, screening, concentrating, mixing, spinning, and vacuum drying the two product streams 47, 49.

Due to the electrical charge of algae and the size of the algae grow area and volume algae, a novel electric battery source is created using bio-photovoltaics. Light-emitting diode (LED) grow lights are connected in a series and parallel arrangement to an anode and cathode structure. A full system alga grow area designed for 250 gpm flow has a power capability of supporting 8.5 kilowatt-hour (kWh) of grow lighting or can power other devices.

Algae harvesting process point 40 is not limited to air flotation, inverted grow area harvesting which greatly reduces operating costs and labor.

Pretreatment of the algae also at process point 40 is included because algae biomass is a challenging substrate for anaerobic digestion due to its high cell wall recalcitrance and protein content. These characteristics call for additional pretreatment and co-fermentation strategies to achieve sufficient fermentation. However, different pretreatments (i.e., not limited to physical, chemical, and enzymatic pretreatments or combinations) shall be part of this endowment to determine the best yield and methane quality. The pretreatment of 2.5% $H_2O_2$, followed by an enzymatic pretreatment, produces biodegradability of 95% and a resulting methane yield of approximately 400 L $CH_4$ per kg volatile solid. This algae pretreatment and $CH_4$ yield efficiency are only cited for demonstration purposes.

Although the invention has been explained in relation to its preferred embodiment, it is to be understood that many other possible modifications and variations can be made without departing from the spirit and scope of the invention as hereinafter claimed.

What is claimed is:

1. A method of using a zero emissions refinery for stillage waste stream recovery of clean water and valuable by-products, the method comprising the steps of:
    collecting a raw stillage stream mixture, wherein the raw stillage stream mixture includes at least 5% concentration of organic matter and unpurified water;
    performing an anaerobic action on the raw stillage stream mixture and producing a digestate stream and a biogas mixture stream, wherein the digestate stream contains sulfite, and wherein the biogas mixture stream includes hydrogen sulfide stream;

performing a liquid mixture-to-gas reaction scrubbing procedure in which the biogas mixture stream is converted into a liquid sulfur compound while enriching biogas production and purifying a main gas stream from the hydrogen sulfide;

performing a gas stream separation procedure in which the main gas stream is separated into an off-gas stream and a product stream, wherein the off-gas stream is substantially composed of carbon dioxide gas, and wherein a product stream is substantially composed of purified methane gas;

exporting the purified methane gas as renewable natural gas;

performing an off-gas stream adsorption procedure and thereby forming a $CO_2$ vent gas stream and a $CH_4$ recycle stream;

collecting the $CO_2$ vent gas stream as liquefied $CO_2$;

injecting the liquefied $CO_2$ as gaseous $CO_2$ into an Algae grow environment;

separating nutrients, water, and solids into a self-sustaining grow liquid environment for Algae;

separating and exporting nutrients and solid remains as valuable by-products;

reacting a liquid grow stream to increase Algae growth and reduce nutrient loading of the liquid grow stream;

filtering upstream reduced nutrients and solids from the liquid grow stream to create acceptable clean water for reuse;

recycling the upstream reduced nutrients and solids back into the self-sustaining grow liquid environment for Algae.

2. The method for zero emissions refinery for stillage waste stream recovery according to claim 1, wherein the liquid grow stream for at least 1% $H_2O_2$, at least 3% broken-down Algae, and a stream remainder, and wherein the stream remainder is unpurified water.

3. A system for a zero emissions refinery of stillage waste streams recovery of clean water and valuable by-products, the system comprising:

a first system being configured to collect raw stillage stream mixture, wherein the raw stillage stream includes at least 5% concentration of organic matter and unpurified water;

at least one anaerobic digester being configured to act on the raw stillage stream mixture and to produce a digestate stream and a biogas mixture stream, wherein the digestate stream contains sulfite, and wherein the biogas mixture stream includes hydrogen sulfide stream;

at least one liquid-gas scrubber being configured to convert the biogas mixture stream into a liquid sulfur compound during an anaerobic action while enriching biogas production and purifying a main gas stream from the hydrogen sulfide;

at least one $CO_2$ gas separation unit being configured to produce a methane-enriched product stream and a $CO_2$ gas-enriched off gas stream;

a second system being configured to export purified methane from the methane-enriched product stream as renewable natural gas;

at least one vacuum pressure swing adsorption (VPSA) unit being configured to perform an off-gas stream adsorption procedure and thereby forming a $CO_2$ vent gas stream and a $CH_4$ recycle stream;

at least one gas liquefying unit being configured to collect the $CO_2$ vent gas stream as liquefied $CO_2$;

at least one gas evaporator unit being configured to inject the liquefied $CO_2$ as gaseous $CO_2$ into an Algae grow environment;

at least one nutrients-water-solids separator unit being configured to create a self-sustaining grow liquid environment for Algae;

a third system being configured to separate and export of nutrients and solid remains as valuable by-products;

a fourth system being configured to react a liquid grow stream to increase Algae growth and reduce nutrient loading of the liquid grow stream for Algae;

at least one water filtering unit being configured to filter upstream reduced nutrients and solids from the liquid grow stream to create acceptable clean water for reuse; and a fifth system being configured to recycle the upstream reduced nutrients and solids from the at least one water filtering unit back into the at least one nutrients-water-solids separator unit.

4. The system for zero emissions refinery for stillage waste stream recovery according to claim 3, wherein the at least one liquid-gas scrubber uses a liquid mixture of $H_2O_2$, broken-down Algae, and unpurified water.

* * * * *